(12) United States Patent
Chiang et al.

(10) Patent No.: US 11,042,802 B2
(45) Date of Patent: Jun. 22, 2021

(54) SYSTEM AND METHOD FOR HIERARCHICALLY BUILDING PREDICTIVE ANALYTIC MODELS ON A DATASET

(71) Applicant: Global Optimal Technology, Inc., Ithaca, NY (US)

(72) Inventors: Hsiao-Dong Chiang, Ithaca, NY (US); Bin Wang, Ithaca, NY (US); Hartley Chiang, Ithaca, NY (US)

(73) Assignees: Global Optimal Technology, Inc., Ithaca, NY (US); ShanDong Global Optimal Big Data Science and Tech, Jinan (CN)

( * ) Notice: Subject to any disclaimer, the term of this patent is extended or adjusted under 35 U.S.C. 154(b) by 790 days.

(21) Appl. No.: 15/289,010

(22) Filed: Oct. 7, 2016

(65) Prior Publication Data
US 2018/0101765 A1 Apr. 12, 2018

(51) Int. Cl.
*G06N 3/08* (2006.01)
*G06N 3/04* (2006.01)

(52) U.S. Cl.
CPC ........... *G06N 3/082* (2013.01); *G06N 3/0454* (2013.01)

(58) Field of Classification Search
CPC .................................................. G06N 3/0454
See application file for complete search history.

(56) References Cited

U.S. PATENT DOCUMENTS

| | | | | |
|---|---|---|---|---|
| 6,546,137 B1* | 4/2003 | Lai | ........................ | G06K 9/6203 382/156 |
| 2002/0062300 A1* | 5/2002 | Asadov | .................... | G06F 16/95 |
| 2003/0200189 A1* | 10/2003 | Meng | ..................... | G06N 3/082 706/26 |
| 2006/0253274 A1* | 11/2006 | Miller | ................... | G06F 17/278 704/9 |
| 2007/0022063 A1* | 1/2007 | Lightowler | ............ | G06N 3/063 706/15 |
| 2013/0018832 A1* | 1/2013 | Ramanathan | ............ | G06N 3/08 706/25 |

(Continued)

OTHER PUBLICATIONS

Hung et al. (Dynamic Hierarchical Self-Organizing Neural Networks, Jul. 1994, pp. 627-632) (Year: 1994).*

(Continued)

*Primary Examiner* — George Giroux
(74) *Attorney, Agent, or Firm* — Tong J. Lee

(57) ABSTRACT

Predictive analytic models are hierarchically built based on a training dataset, which includes pairs of input data and output data. First, the input data and the output data are preprocessed. A hierarchical clustering process is performed on the dataset. The hierarchical clustering process comprises level-1 input and output data clustering, level-2 input and output data clustering, and so on, up to level-K input and output data clustering, where K is an integer greater than one. A hierarchical model building process is performed. The hierarchical model building process comprises level-1 model building over level-1 clustered input and output data, level-2 model building over level-2 clustered input and output data, and so on, up to level-K model building over level-K clustered input and output data. At least one level-K predictive model is generated as the resulting built model.

20 Claims, 11 Drawing Sheets

(56) References Cited

U.S. PATENT DOCUMENTS

| | | | |
|---|---|---|---|
| 2014/0257767 A1* | 9/2014 | Chiang | G06F 17/5009 |
| | | | 703/2 |
| 2014/0279725 A1* | 9/2014 | Kuusela | A61N 5/103 |
| | | | 706/11 |
| 2015/0238148 A1* | 8/2015 | Georgescu | G06K 9/4628 |
| | | | 600/408 |
| 2016/0062985 A1* | 3/2016 | Epstein | G06F 16/353 |
| | | | 704/9 |
| 2016/0063097 A1* | 3/2016 | Brown | G06K 9/6254 |
| | | | 707/737 |
| 2016/0171089 A1* | 6/2016 | Richard | G06Q 10/063 |
| | | | 707/741 |

OTHER PUBLICATIONS

Guha, et al., Cure: an efficient clustering algorithm for large databases, Information Systems 26, 2001, pp. 35-58.

Deppisch, et al., Hierarchical training of neural networks and prediction of chaotic time series, Physics Letters A 158 1991, pp. 57-62.

\* cited by examiner

Model Building

Model Deployment

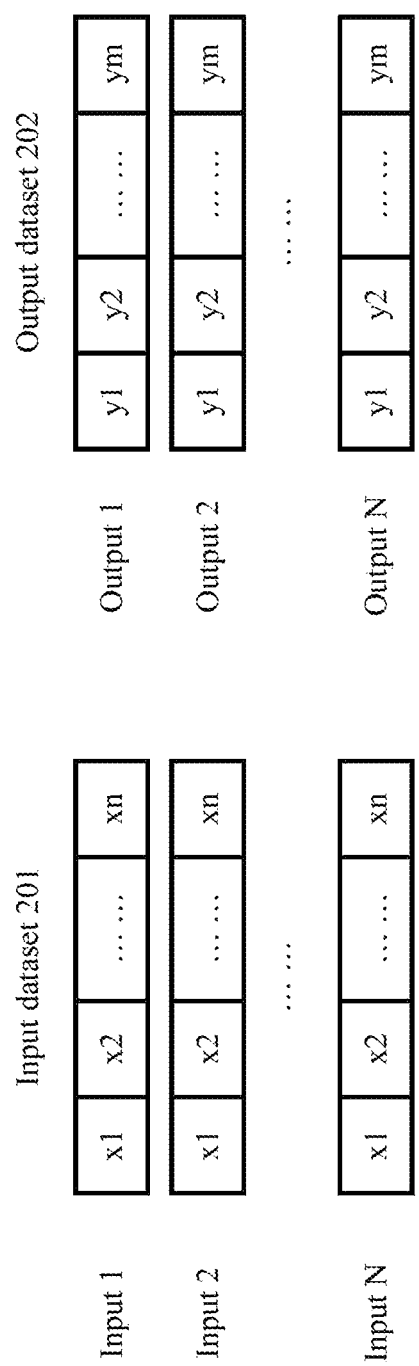

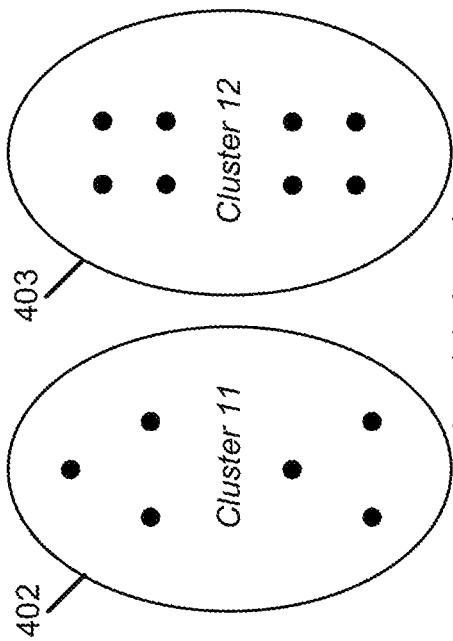
FIG. 4A The data set
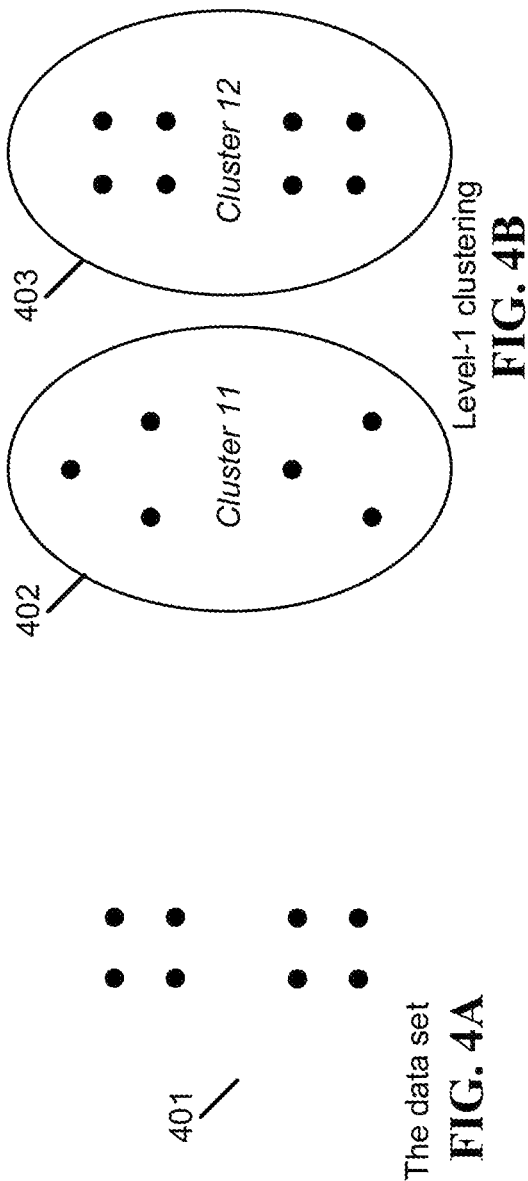
FIG. 4B Level-1 clustering
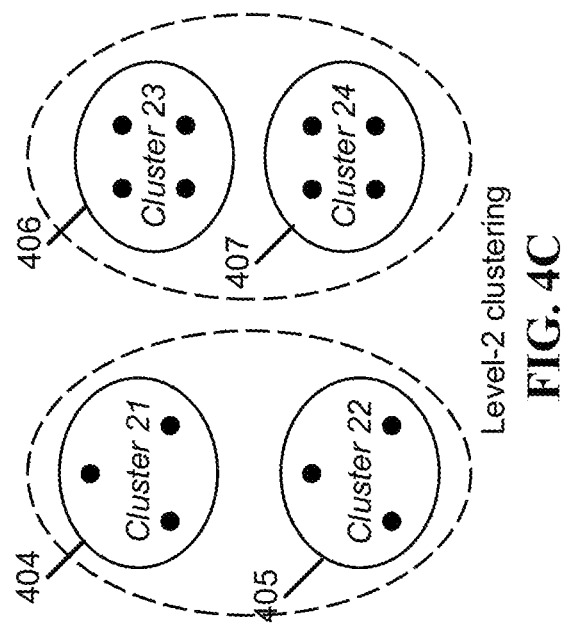
FIG. 4C Level-2 clustering
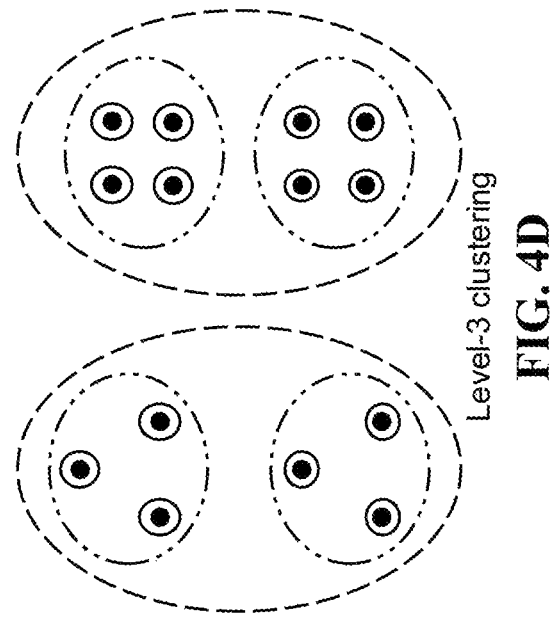
FIG. 4D Level-3 clustering

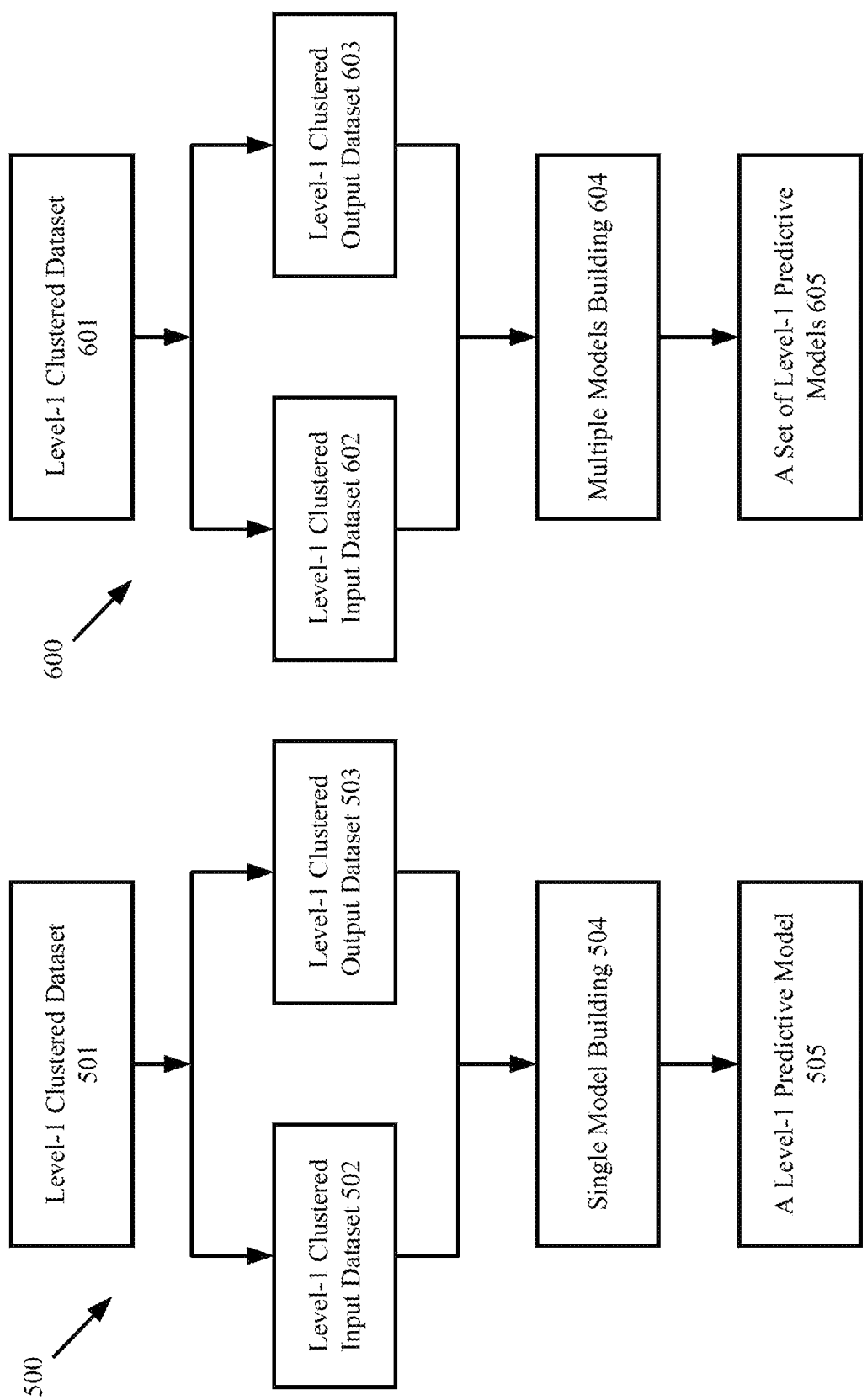

SYSTEM AND METHOD FOR HIERARCHICALLY BUILDING PREDICTIVE ANALYTIC MODELS ON A DATASET

TECHNICAL FIELD

Embodiments of the invention pertain to the field of data mining systems used to generate predictive analytic models, and more specifically, a computerized method, system and program product that generate predictive analytic models to recognize a target or a pattern from high volume and/or high dimensional datasets, or to otherwise evaluate high volume and/or high dimensional datasets.

BACKGROUND

The volume of a spread type of data, structured and unstructured, produced and available in all walks of our digital and connected society is undergoing an explosive growth. The vast amount of data on one hand imposes new challenges in data storage, processing, analytics, and interactive exploration. On the other hand, the optimum use of this massive amount of complex data can be transformed to tremendous economic and social values. Consequently, the analytic process, termed "knowledge discovery" or "data mining", of exploring the data and finding meaningful information and consistent patterns hidden in such large amounts of data, also known as "Big Data", to support decision making in different areas becomes more and more important. The ultimate goal of data mining is prediction, or to apply the detected patterns to new datasets to produce predictions of some unknown values. Therefore, predictive data mining is the most common type of data mining and one that has the most direct scientific, business and social applications.

The process of data mining generally consists of three stages: 1) initial data exploration, 2) model building, and 3) model deployment. The first stage of exploration usually starts with data preparation that may involve data cleaning, data transformations, and data selection. Then, depending on the nature of the analytic problem, this stage may involve a choice of the proper predictive model to be built in the next stage. The second stage of model building involves considering various model structures and parameters and choosing the best combination based on their predictive performance. This stage involves an elaborate process and there are a variety of techniques developed to achieve the goal. These techniques include bagging (e.g., voting or averaging), boosting, stacking, and meta-learning. The final stage of deployment involves applying the model built and selected in the previous stage to new data in order to generate predictions or estimates of the expected outcome. The second stage of model building is the main focus of this disclosure.

The stage of model building first involves the choice of a proper type of predictive model. Data mining is a blend of statistics, artificial intelligence (AI) and database research. There are many approaches and techniques developed and available for conducting predictive analytics. These approaches and techniques can be broadly grouped into regression techniques and machine learning techniques. Regression techniques or models focus on establishing a mathematical equation as a model to represent the interactions between the different data variables in consideration. There is a wide variety of regression models that can be applied for predictive analytics. These models include, but are not limited to, linear regression, discrete choice models, logistic regression, multinomial logistic regression, probit regression, time series models, regression trees, and multivariate adaptive regression splines. In certain applications, it is sufficient to directly predict the dependent variable without focusing on the underlying relationships between variables; or the underlying relationships can be very complex and the mathematical form is very difficult to represent or even unknown. For such applications, machine-learning techniques, which emulate human cognition and learn from training examples, can be a better consideration. Machine learning techniques or models include a number of advanced statistical methods for regression and classification. These techniques include, but not limited to, artificial neural networks (ANN), multilayer perceptron (MLP), radial basis functions (RBF), support vector machines (SVM), naïve Bayes, k-nearest neighbors (KNN), and geospatial predictive modeling.

The stage of building a predictive model generally involves computing the best structure of the chosen model and computing the best parameters of the chosen model with the chosen structure. The computations usually involve the process of solving some optimization problems or can be improved to produce better-performing models by formulating and solving some optimization problems. The relationships between the effectiveness and performance of the predictive model for data mining and its structure and parameters can be complex and generally nonlinear. Therefore, the involved optimization problem could contain many local optimal solutions, and their objective values of these local optimal solutions can differ significantly to each other, which in turn will be translated to the discrepancy between the performances of the resulting models corresponding to these local optimal solutions.

Existing optimization methods for solving optimization problems can be broadly categorized into two types. The first type is called local methods, such as trust-region methods, sequential quadratic programming (SQP), and interior point methods (IPM). These methods usually solve first-order necessary conditions numerically to find local optimal solutions to the involved optimization problem. They are generally deterministic and fast to compute a local optimal solution, but can be entrapped in the local optimal solution. The other type is called global methods, such as genetic algorithms (GA), particle swarm optimization (PSO) and simulated annealing (SA). These methods generally use stochastic heuristics to escape from a local optimal solution and directly search for an approximation to the global optimal solution to the involved optimization problem. Global methods are good at locating promising areas, but they are generally computationally demanding to find a good approximation to the global optimal solution. Therefore, in order to realize a system of well-performing predictive analytical models, it is desirable to incorporate in the process of model building a deterministic optimization method that not only can escape from a local optimal solution, but also can compute multiple local optimal solutions to the involved optimization problem.

SUMMARY

There usually exist special inherent structures in "Big Data" of a large data volume or large data dimensions. For a dataset of a large volume, there usually exist group properties among data samples; more specifically, some data samples in the dataset are more similar to each other than to the remaining data samples in the dataset. Therefore, data samples that are similar to each other can form data groups, and data samples belonging to a same group can be approximated by a few representative data samples in the group. On the other hand, for a dataset of large data dimensions, that is, of a large number of variables or features, there usually exist group properties among data variables or features; more specifically, some data variables or features in the dataset are more similar to each other than to the remaining data variables or features in the dataset. Therefore, data variables or features that are similar to each other can form feature groups, and data variables or features belonging to a same group can be approximated by a few representative data variables or features in the group. It is one aspect of this invention to provide a system and method for building a plurality of predictive models on a dataset, taking advantage of such group properties embedded in the dataset.

As mentioned before, building optimal predictive models for usage in data mining is an optimization task. Therefore, optimization technology plays an important role in building optimal analytical models for effective data mining. In this regard, it is yet another aspect of this invention to provide a system and method for building a plurality of predictive models on a dataset not only taking advantage of group properties embedded in the dataset, but also taking advantage of effective optimization methods for building optimal predictive models.

Briefly stated, a system and method is provided herein for building predictive analytic models for data mining in a hierarchical manner.

In one embodiment, there is provided a computer-implemented method which hierarchically builds a plurality of predictive analytic models based on a training dataset. The method comprises the steps of: preprocessing the training dataset that includes an input dataset and an output dataset, both of which comprise a plurality of features; hierarchically clustering the training dataset, wherein the hierarchical clustering comprises K levels of clustering of the input dataset and the output dataset to produce K levels of clustered input and output data, wherein K is an integer greater than one; hierarchically building the plurality of predictive analytic models, which further comprises training K levels of predictive models over the K levels of clustered input and output data, respectively; and generating at least a level-K predictive model as an output.

In another embodiment, there is provided a system which hierarchically builds a plurality of predictive analytic models based on a training dataset. The system comprises: one or more processors and a memory. The memory contains instructions executable by the one or more processors, and the one or more processors are operable to: preprocess the training dataset that includes an input dataset and an output dataset, both of which comprise a plurality of features; hierarchically cluster the training dataset by clustering K levels of the input dataset and the output dataset to produce K levels of clustered input and output data, wherein K is an integer greater than one; hierarchically build the plurality of predictive analytic models by training K levels of predictive models over the K levels of clustered input and output data, respectively; and generate at least a level-K predictive model as an output.

In yet another embodiment, a non-transitory computer readable storage medium is provided. The non-transitory computer readable storage medium includes instructions that, when executed by a computing system, cause the computing system to perform the aforementioned method for which hierarchically builds a plurality of predictive analytic models based on a training dataset. The method comprises: preprocessing the training dataset that includes an input dataset and an output dataset, both of which comprise a plurality of features; hierarchically clustering the training dataset, wherein the hierarchical clustering comprises K levels of clustering of the input dataset and the output dataset to produce K levels of clustered input and output data, wherein K is an integer greater than one; hierarchically building the plurality of predictive analytic models, which further comprises training K levels of predictive models over the K levels of clustered input and output data, respectively; and generating at least a level-K predictive model as an output.

BRIEF DESCRIPTION OF THE DRAWINGS

FIG. 2A is a schematic illustration of an arrangement of the input dataset according to one embodiment.

FIG. 2B is a schematic illustration of an arrangement of the output dataset according to one embodiment.

FIG. 4A-FIG.4D are schematic illustrations of a process for hierarchical feature clustering.

FIG. 5 is a flowchart illustrating a process for training a single level-1 model of the hierarchical training method according to an embodiment of the invention.

FIG. 6 is a flowchart illustrating a process for training multiple level-1 models of the hierarchical training method according to an embodiment of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a system and method for mining "Big Data" by building predictive models. Such a predictive model may handle datasets that are "big" in terms of the data volume (i.e., the number of data samples or records exceeds a volume threshold), and/or the data dimension (i.e., the number of data variables or features exceeds a feature threshold). For example, each of the volume threshold and the feature threshold may be a number equal to or greater than 1000. Directly building the predictive model on the dataset either having a big volume or having a big dimension can be a very difficult task in that 1) the model building process can be computationally very demanding, and 2) the number of local optimal solutions can grow very fast, even exponentially, as the data volume or data dimension grows, causing difficulty in finding the best model structure and parameters.

The predictive models described herein may have applications in many scientific and industrial areas. As one example, the predictive model can be used in electric power industry to forecast system demands, inter-area interchanged energy, and renewable energy (e.g., wind, solar, biomass, etc.) generations. As another example, the predictive model can be used in financial engineering to forecast stock index returns and to assess credit risks. As yet another example, the predictive model can be used in mass surveillance systems to automatically read vehicle registration plates in images or videos captured by cameras. As yet another example, the predictive model can be used in healthcare to realize computer-aided medical diagnosis.

Figures 1A, 1B:
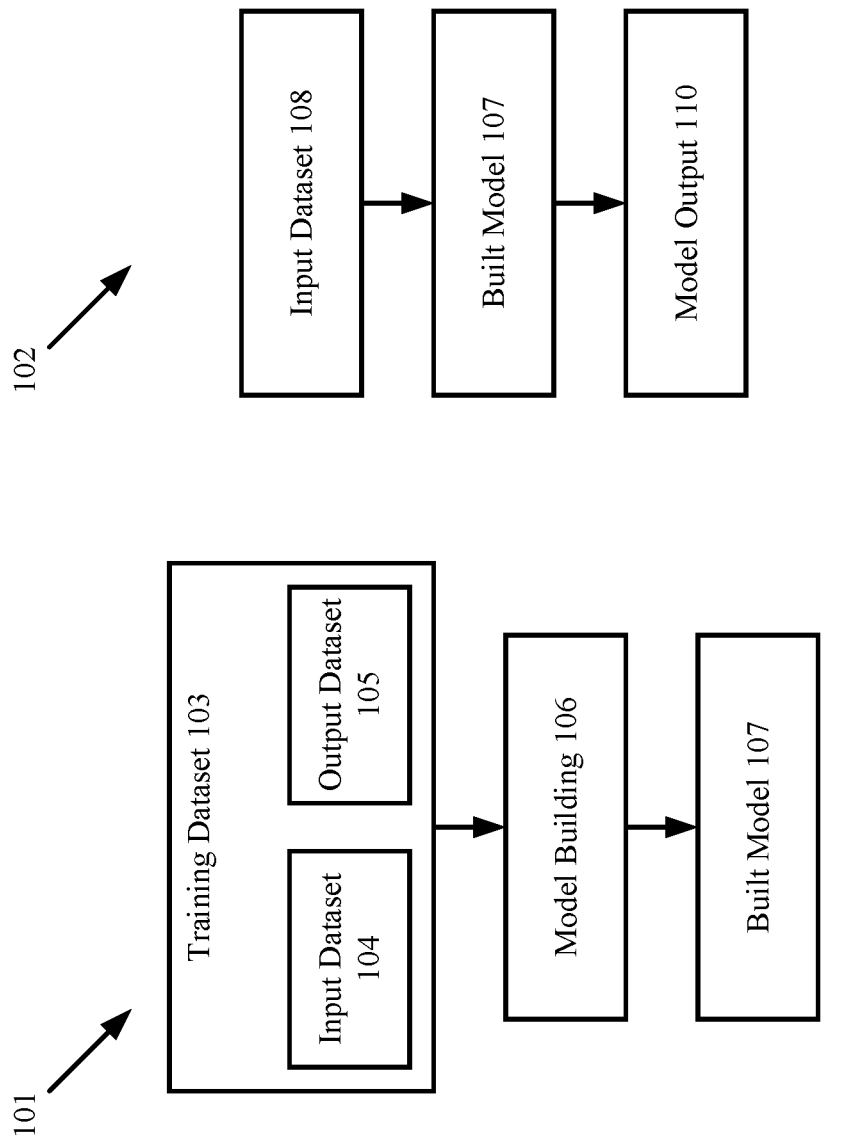
FIG. 1A is a flowchart that illustrates a process of model building and training according to one embodiment.
FIG. 1B is a flowchart that illustrates a process of deploying a built model to another dataset to obtain a model output according to one embodiment.

Referring to FIG. 1A and FIG. 1B, a process 101 of model building and a process 102 of model deployment are illustrated according to one embodiment. In addition to the necessary data preparation that may involve data cleaning, data transformations and data selection and choosing the type of predictive model, the major effort of data mining is expended on the processes 101, 102 of model building and model deployment. In the process 101 of model building, after data preparation, a training dataset 103 can be available for building a predictive model. The training dataset 103 comprises an input dataset 104 and an output dataset 105. In the process 101 of model building with the training dataset 103, a stage of model building 106 is carried out, which involves considering various model structures and parameters and choosing the best combination of a model structure and the associated parameters based on the predictive performance of the resulting model. Model building 106 involves an elaborate process and there are a variety of techniques developed to achieve the goal of model building, such as bagging (voting or averaging), boosting, stacking, and meta-learning. In the process 101 of model building, the output of the stage of model building 106 is a model built 107 with best predictive performance. In the process 102 of model deployment, an input dataset 108 is provided and the built model 107 is applied on the input dataset 108 to produce the model output 110, which is a prediction or estimate of the expected outcome.

FIG. 2A is a schematic illustration of an arrangement of an input dataset 201 according to one embodiment. FIG. 2B is a schematic illustration of an arrangement of an output dataset 202 according to one embodiment. During the process 101 of model building, the training dataset 103 comprises both the input dataset 104, which is shown in FIG. 2A as the input dataset 201, and the output dataset 105, which is shown in FIG. 2B as the output dataset 202. During the process 202 of model deployment, the input dataset 108, which is shown as the input dataset 201, is input to the built model 107 to produce the model output 110, which is shown as the output dataset 202. Each of the input and output datasets 201 and 202 can comprise a plurality of data samples or data records. For example, the input dataset 201 can comprise input data record 1, input data record 2, . . . , and input data record N. The output dataset 202 can comprise output data record 1, output data record 2, . . . , and output data record N. The number of input data records is the same as the number of output data records. For "Big Data" applications, the number N can be very large, such as several millions or even larger. Each input data record can comprise a plurality of input data variables (also called features). An input data record can comprise input data variable $x_1$, input data variable $x_2$, . . . , and input data variable $x_n$. For "Big Data" applications, the number n can also be very large, such as several thousands or even millions. An output data record can comprise a plurality of output data variables. An output data record can comprise output data variable $y_1$, output data variable $y_2$, . . . , and output data variable $y_m$. For "Big Data" applications, the number m can also be very large, such as several thousands. The number of input data variables, namely n, and the number of output data variables, namely m, are generally different. A predictive model is built to explore meaningful relationships between input data variables, namely $x_1$ through $x_n$, and output data variables, namely $y_1$ through $y_m$, and such relationships are stored in the built predictive model. Mathematically speaking, a predictive model implements a function $Y=F(X)$, with $X=(x_1, x_2, \ldots, x_n)$, $Y=(y_1, y_2, \ldots, y_m)$, and $F:R^n \rightarrow R^m$ to best approximate the underlying relationships between input data variables (or features) $x_1, x_2, \ldots, x_n$ and output data variables (or features) $y_1, y_2, \ldots, y_m$.

Figure 3:
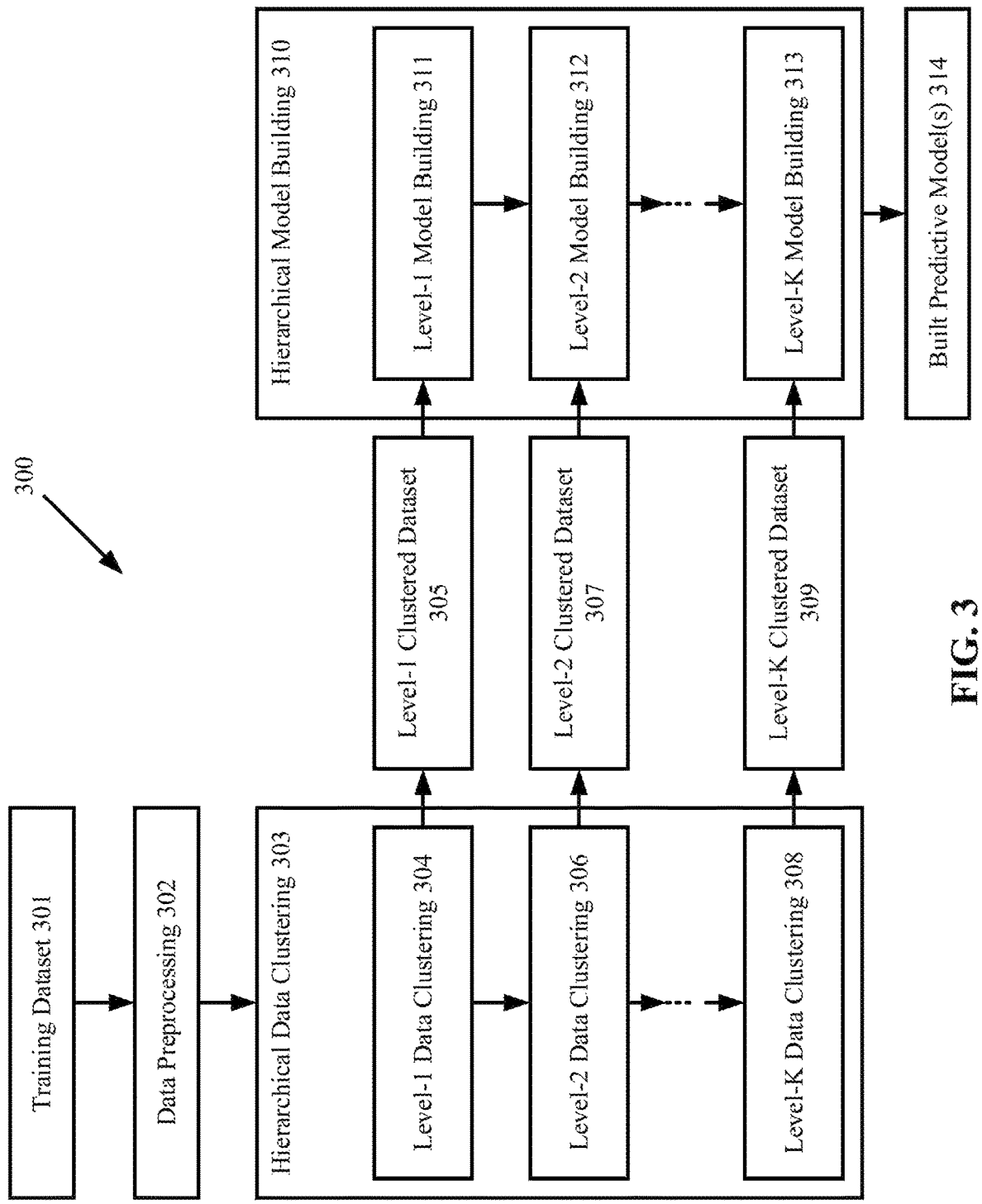
FIG. 3 is a flowchart illustrating a process for a hierarchical training method according to an embodiment.

Hierarchical Predictive Model Building. Referring to FIG. 3, a process 300 for a system and method for hierarchically building a plurality of predictive analytic models on a dataset is illustrated according to an embodiment of the invention. The training dataset 103 of FIG. 1 is shown here in FIG. 3 as a training dataset 301. The process 300 starts with the provided training dataset 301, and comprises a first step of data preprocessing 302 that applies several operations to the training dataset 301. The data preprocessing 302 comprises preprocessing the input dataset and preprocessing the output dataset. The operations involved in the step of data preprocessing 302 can include, but are not limited to, data normalization and data filtering to remove noise. The operations applied to the input dataset can be different from the operations applied to the output dataset. Once the dataset has been processed, a hierarchical data clustering 303 is then carried out on the training dataset. The hierarchical data clustering 303 comprises level-1 data clustering 304 to produce level-1 clustered dataset 305, level-2 data clustering 306 to produce level-2 clustered dataset 307, and so on, up to level-K data clustering 308 to produce level-K clustered dataset 309.

The choices of the number of hierarchical levels, namely, the number K and the number of clusters at each level depend on the data and the application. Empirically, the number of clusters at level-1 may be chosen to be around 10. The number K is chosen depending on the training dataset size (i.e., volume, which is the number of data samples or data records) or the dimension of dataset (i.e., the number of data features). Empirically, the scale-up factor (i.e., the increase in the number of clusters) from one level to the next may be chosen to be no more than 5. Usually, the scale-up factor increases as the level increases.

The process of hierarchical data clustering 303 comprises hierarchical data clustering on the input dataset and hierarchical data clustering on the output dataset. In one embodiment of the present invention, the process of hierarchical data clustering 303 is performed on data records, namely, to hierarchically compute groups of data records such that data records belonging to a same group are similar to each other while data records belonging to different groups are quite different from each other, and that the number of data variables (i.e. features) stays unchanged for each cluster. In another embodiment of the present invention, the process of hierarchical data clustering 303 is performed on data variables, namely, to hierarchically compute groups of data variables (i.e. features) such that data variables belonging to a same group are similar to each other while data variables belonging to different groups are different from each other, and that the number of data records stays unchanged for each cluster. In the process of hierarchical data clustering 303, the number of clusters increases as the level is raised. In the process of hierarchical data clustering 303, the data clusters at level k−1 is used for data clustering at level k, where k=2, . . . ,K.

Based on the result of the process of hierarchical data clustering 303, a process 310 of hierarchical model building is then carried out, which comprises level-1 model building 311 using the level-1 clustered dataset 305, level-2 model building 312 using the level-2 clustered dataset 307, and so on, up to level-K model building 313 using the level-K clustered dataset 309. In the process 310 of hierarchical model building, the model built at level k−1 is used for model building at level k, where k=2, . . . , K. The built model at the last level, namely, level-K built model is a resulting built predictive model 314 and is the model to be deployed. Depending on the application and the training dataset, the process 310 of hierarchical model building may output multiple resulting built predictive models 314 that correspond to multiple models built at level 1. The process of model building does not require all levels of data clustering is completed. Instead, level-1 model building can start once level-1 clustering is completed, level-2 model building can start once level-2 clustering is completed, and so on.

The process of building a model generally involves computing the best structure of the chosen model and computing the best parameters of the chosen model with the chosen structure. This process usually involves solving some optimization problems and these optimization problems could have many local optimal solutions with varied performances. On the other hand, multiple models corresponding to different local optimal solutions can be used for other purposes; for instance, these models can be used to build an ensemble model which combines the outputs of the local optimal models to achieve predictions with improved quality. In one embodiment, the TRUST-TECH method can be applied to compute multiple local optimal models by computing multiple local optimal solutions to the involved optimization problems.

FIG. 4A-FIG. 4D illustrate hierarchical data clustering for hierarchically building a plurality of predictive analytic models according to one embodiment. FIG. 4A illustrates an original dataset 401 comprises a plurality of data points. In one embodiment, each data point corresponds to a data record in the dataset. In another embodiment, each data point corresponds to a data variable in the dataset. Level-1 clustering is first carried out using a clustering algorithm on the dataset 401, as illustrated in FIG. 4B. Level-1 clustering produces a number of level-1 clusters, such as cluster 11 (group 402) and cluster 12 (group 403). In one embodiment, clustering is carried out on the data records; therefore, each level-1 cluster contains a subset of data records with all data variables; namely, cluster 11 (group 402) contains, with all data variables, a subset of the dataset 401 which are similar to each other, cluster 12 (block 403) contains, with all data variables, the remaining subset of the dataset 402 which are similar to each other, but are different to the data records in cluster 11 (group 402). In another embodiment, clustering is carried out on the data variables, therefore, each level-1 cluster contains all data records with a subset of data variables; namely, cluster 11 (group 402) contains all data records with a subset data variables of the dataset 401 which are similar to each other, cluster 12 (group 403) contains all data records with the remaining subset of data variables of the dataset 402 which are similar to each other, but are different from the data variables in cluster 11 (group 402). Level-2 clustering is then carried out using a clustering algorithm on the dataset 401, as illustrated in FIG. 4C. Level-2 clustering produces a number of level-2 clusters over each level-1 cluster; for example, level-2 cluster 21 (group 404) and cluster 22 (group 405) are produced over the level-1 cluster 11 (block 402), level-2 cluster 23 (group 406) and cluster 24 (group 407) are produced over the level-1 cluster 12 (block 403). This process is repeated until K levels have been reached, e.g., K=3 as illustrated in FIG. 4D.

The number of levels for hierarchical clustering, namely K, is predefined. At the final level, namely, level K, the number of total clusters cannot be larger than the number of data points. In one embodiment, the hierarchical clustering is performed on data records, the number of total clusters at level K is less than or equal to the number of data records. In another embodiment, the hierarchical clustering is performed on data variables, the number of total clusters at level K is less than or equal to the number of data variables.

In the process of hierarchical data clustering illustrated in FIG. 4A-FIG. 4D, a number of clustering methods can be used to perform clustering at each level of the process. In one embodiment, the clustering method can be the k-means clustering method. In another embodiment, the clustering method can be the fuzzy c-means clustering method. In yet another embodiment, the clustering method can be the self-organizing map. In yet another embodiment, the clustering method can be the affinity propagation method. The choice of the clustering method for different levels is flexible. In one embodiment, the same clustering method can be used to perform clustering at each level of the process. In another embodiment, different clustering method can be used to perform clustering at different levels of the process.

FIG. 5 illustrates a process 500 of building a level-1 predictive model for hierarchically building a plurality of predictive analytic models according to one embodiment. The level-1 clustered dataset 305 of FIG. 3 is shown herein as a level-1 clustered dataset 501. The process 500 starts with the level-1 clustered dataset 501, which comprises a level-1 clustered input dataset 502 and a level-1 clustered output dataset 503. Then, a process 504 of building a single predictive model is carried out, which produces a single level-1 predictive model 505.

The problem of building optimal models can be formulated as an optimization problem of the form:

$$\min f(w). \tag{1}$$

In an embodiment, the objective function $f(w)$ for the predictive model building can be the mean squared error (MSE) between the model outputs $F(X)$ and the actual values Y, given the parameter vector w, that is $$f(w) = \frac{1}{N}\sum_{i=1}^{N} \|F(X_i) - Y_i\|^2.$$

The objective function $f(w)$ can be a nonlinear and nonconvex function of the parameter vector w and can have multiple local optimal solutions. In addition, the number of local optimal solutions can grow very fast, even exponentially, as the data volume or data dimension grows, causing difficulty in finding the best model structure and parameters. In one embodiment, multiple local optimal predictive models may be computed at the lower levels of the hierarchy, and the local optimal predictive models may be propagated to higher levels of the hierarchy. The choice of the training method to determine the model parameter values for different levels is also flexible. In one embodiment, the same training method can be used to perform training at each level of the process. In another embodiment, different training method can be used to perform training at different levels of the process.

Referring to FIG. 6, a process 600 of building multiple level-1 predictive models is illustrated for hierarchically building a plurality of predictive analytic models according to one embodiment. The level-1 clustered dataset 305 of FIG. 3 is shown as a level-1 clustered dataset 601. The process 600 starts with the level-1 clustered dataset 601, which comprises level-1 clustered input dataset 602 and level-1 clustered output dataset 603. Then, a process 604 of building multiple predictive models is carried out, which produces a set of level-1 predictive models 605.

Figure 7:
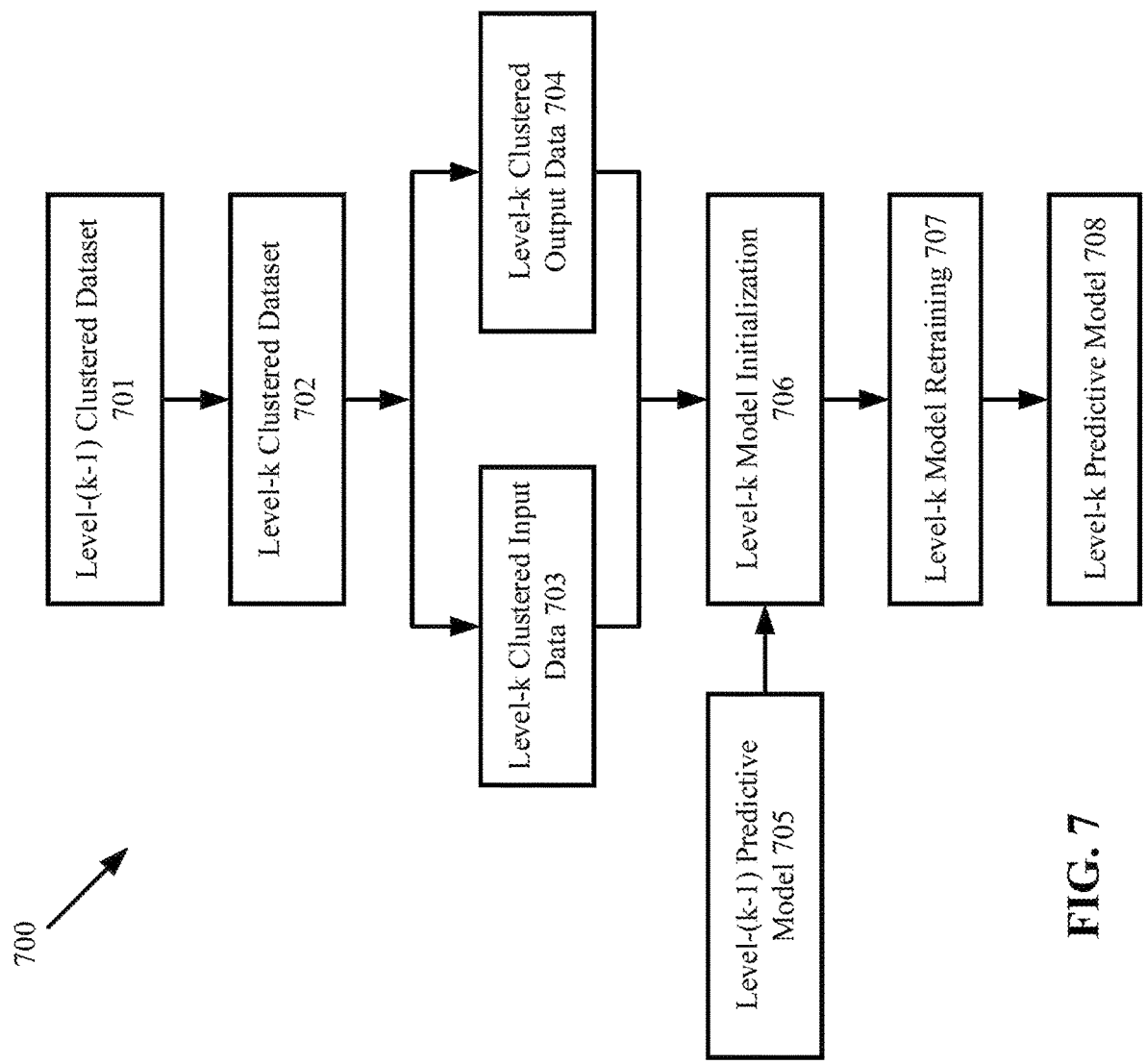
FIG. 7 is a flowchart of illustrating a process for training a single level-k (k>1) model of the hierarchical training method according to an embodiment of the invention.

FIG. 7 illustrates a process 700 of building a higher level (level k with k>1) predictive model for hierarchically building a plurality of predictive analytic models according to one embodiment. The process 700 starts with a level-(k−1) clustered dataset 701, which comprises a level-(k−1) clustered input dataset and a level-(k−1) clustered output dataset, and with a level-k clustered dataset 702, which comprises a level-k clustered input dataset 703 and a level-k clustered output dataset 704. Then, provided with a level-(k−1) predictive model 705, a step 706 of initializing the level-k predictive model is carried out, which produces an initial level-k predictive model. This initial predictive model is generally not an optimal predictive model. Therefore, a step 707 of retraining the initial level k model is carried out, which produces a level-k predictive model 708. If there are multiple level-(k−1) predictive models, the process 700 is performed on each level-(k−1) predictive mode and produces a different level-k predictive model. In this manner, optimal predictive models at the lower levels of the hierarchy propagate to the optimal predictive models at the higher levels of the hierarchy.

Figure 8:
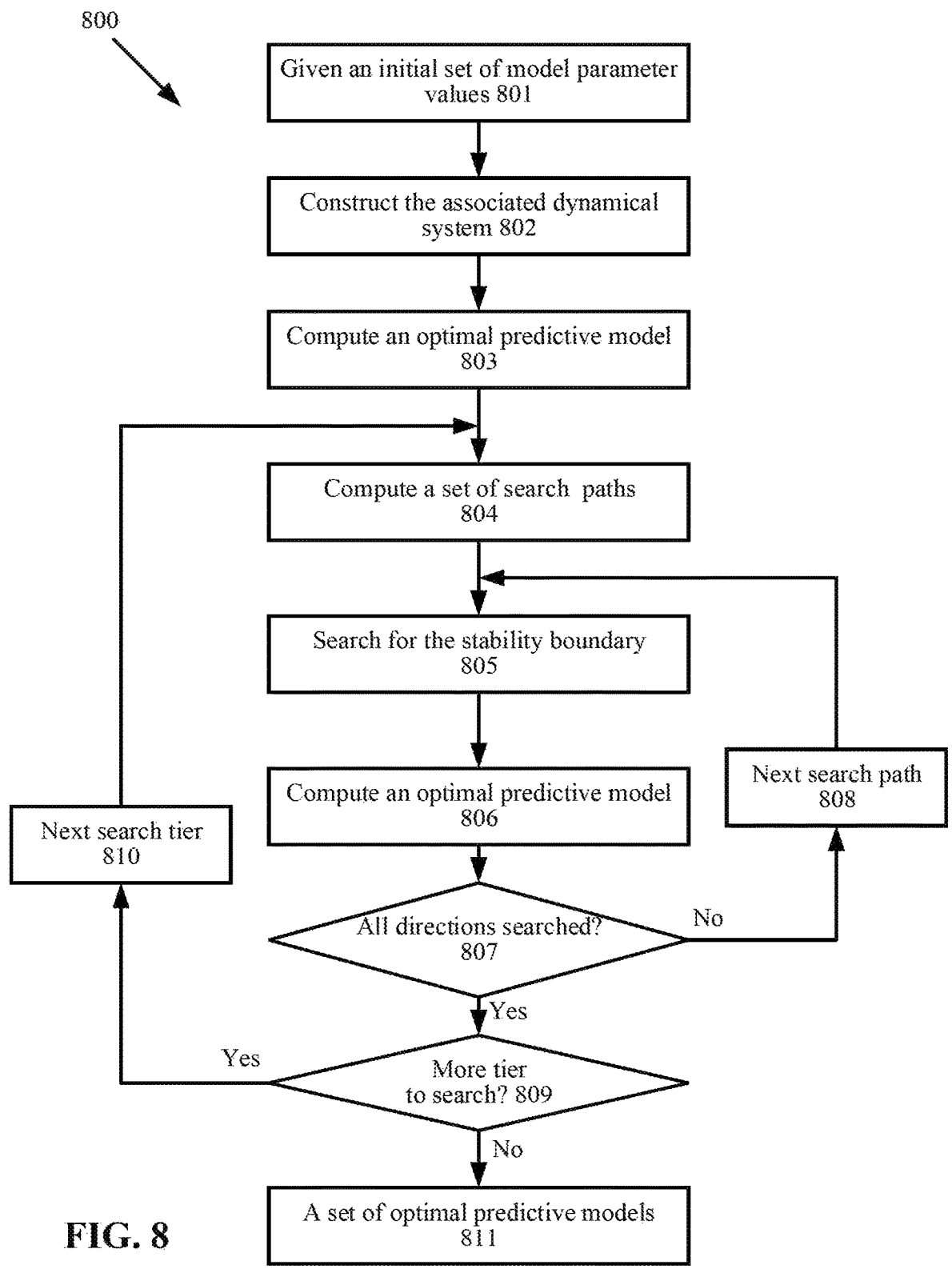
FIG. 8 is a flowchart illustrating a process for training multiple models using a TRUST-TECH method according to an embodiment of the invention.

FIG. 8 illustrates a process 800 of building multiple level-1 predictive models using a TRUST-TECH method for hierarchically building a plurality of predictive analytic models according to one embodiment; that is, the process 800 is one example of a realization of the process 604 of FIG. 6. In one embodiment, the process 800 may be used to build higher levels of predictive models. The process 800 starts with an initial set of model parameter values, noted as $w_0$ (block 801), and comprises the following steps.

Step 1) An associated dynamical system is constructed (block 802), where each local optimal set of parameter values of the model corresponds to a stable equilibrium point (SEP) of the dynamical system.

Step 2) A local optimization method is applied from the initial parameters $w_0$ to compute an initial SEP $w_s^0$ of said dynamical system, which also corresponds to a local optimal predictive model (block 803).

Step 3) Set i=0, $V_s = \{w_s^0\}$, $V_{new}^i = \{w_s^0\}$.

Step 4) Set $V_{new}^{i+1} = \emptyset$ and for each SEP in $V_{new}^i$, perform steps (5) through (9).

Step 5) Compute a set of search paths $\{S_i^j, j=1,2,\ldots,m_i\}$, and set j=1 (block 804).

Step 6) Search for the stability boundary of the dynamical system along the search path $S_i^j$, and if the stability boundary is found, proceed to step (7), otherwise proceed to step (9) (block 805).

Step 7) Locate a point $w_0^j$ that is located in another stability region. A local optimization method is applied from said initial parameters $w_0^j$ to compute an SEP $w_s^j$ of said dynamical system, which also corresponds to a local optimal predictive model (block 806).

Step 8) Check whether $w_s^j \in V_s$, and if $w_s^j \in V_s$, then proceed to step (9), otherwise, set $V_s = V_s \cup \{w_s^j\}$ and $V_{new}^{i+1} = V_{new}^{i+1} \cup \{w_s^j\}$ and proceed to step (9).

Step 9) Set j=j+1 and check if j<=$m_i$ (block 807), and if j<=$m_i$, then proceed to step (6) (block 808), otherwise, proceed to step (10).

Step 10) Check if $V_{new}^{i+1}$ is non-empty (block 809), and if $V_{new}^{i+1}$ is non-empty, then set i=i+1 and proceed to step (5) (block 810), otherwise, proceed to step (11).

Step 11) Output Vs, that is, the set of multiple SEPs of the dynamical system, which are also local optimal model parameters (block 811). Each set of local optimal parameters corresponds to a local optimal predictive model. Furthermore, each local optimal predictive model at level 1 propagates to higher levels of the model hierarchy according to the process 700 of FIG. 7 to produce a level-K predictive model.

Figure 9:
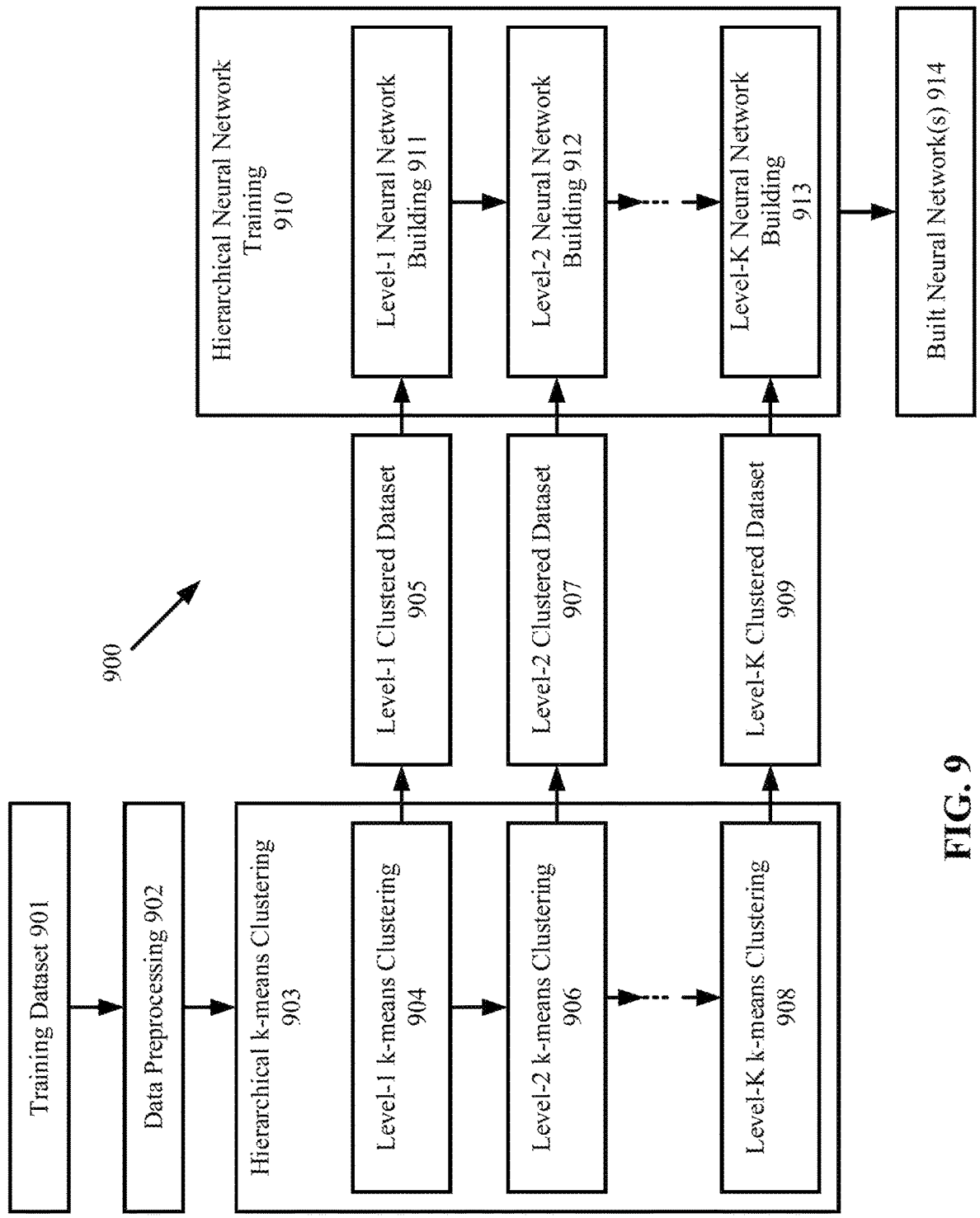
FIG. 9 is a flowchart illustrating a process for the hierarchical training method for training neural network models according to an embodiment of the invention.

Hierarchical Artificial Neural Network Training. FIG. 9 illustrates a process 900 for hierarchically building a plurality of neural network models on a dataset according to one embodiment. A training dataset 901 is an example of the training dataset 103 of FIG. 1A. The process 900 starts with the provided training dataset 901, and comprises a first step of data preprocessing 902 that applies several operations on the training dataset 901. The data preprocessing 902 comprises preprocessing the input dataset and preprocessing the output dataset. The operations involved in the step of data preprocessing 902 can include, but are not limited to, data normalization and data filtering to remove noise. Once the dataset has been processed, a process 903 of hierarchical data clustering using a k-means clustering algorithm is then carried out on the dataset, which comprises level-1 k-means data clustering 904 to produce level-1 clustered dataset 905, level-2 k-means data clustering 906 to produce level-2 clustered dataset 907, and so on, up to level-K k-means data clustering 908 to produce level-K clustered dataset 909.

The process 903 of hierarchical data clustering comprises hierarchical data clustering on the input dataset and hierarchical data clustering on the output dataset. In the embodiment of FIG. 9, the process 903 of hierarchical data clustering is performed on data variables, namely, to hierarchically compute groups of data variables (i.e. features) such that data variables belonging to a same group are similar to each other while data variables belonging to different groups are different from each other, and that the number of data records stays unchanged for each cluster. In the process 903 of hierarchical data clustering, the number of clusters increases as the level is raised. In the process 903 of hierarchical data clustering, the data clusters at level k−1 is used for data clustering at level k, where k=2, ..., K.

Based on the result of the process 903 of hierarchical data clustering, a process 910 of hierarchical neural network building is then carried out, which comprises level-1 neural network building 911 using the level-1 clustered dataset 905, level-2 neural network building 912 using the level-2 clustered dataset 907, and so on, up to level-K neural network building 913 using the level-K clustered dataset 909. In the process 910 of hierarchical neural network building, the neural network built at level k−1 is used for model building at level k, where k=2, . . . , K. The neural network built at the last level, namely, level-K built neural network is the resulting built neural network model 914 and is the model to be deployed. Depending on the application and the training dataset, the process 910 of hierarchical neural network building may output multiple resulting built neural network models 914 that correspond to multiple neural networks built at level 1.

Figure 10:
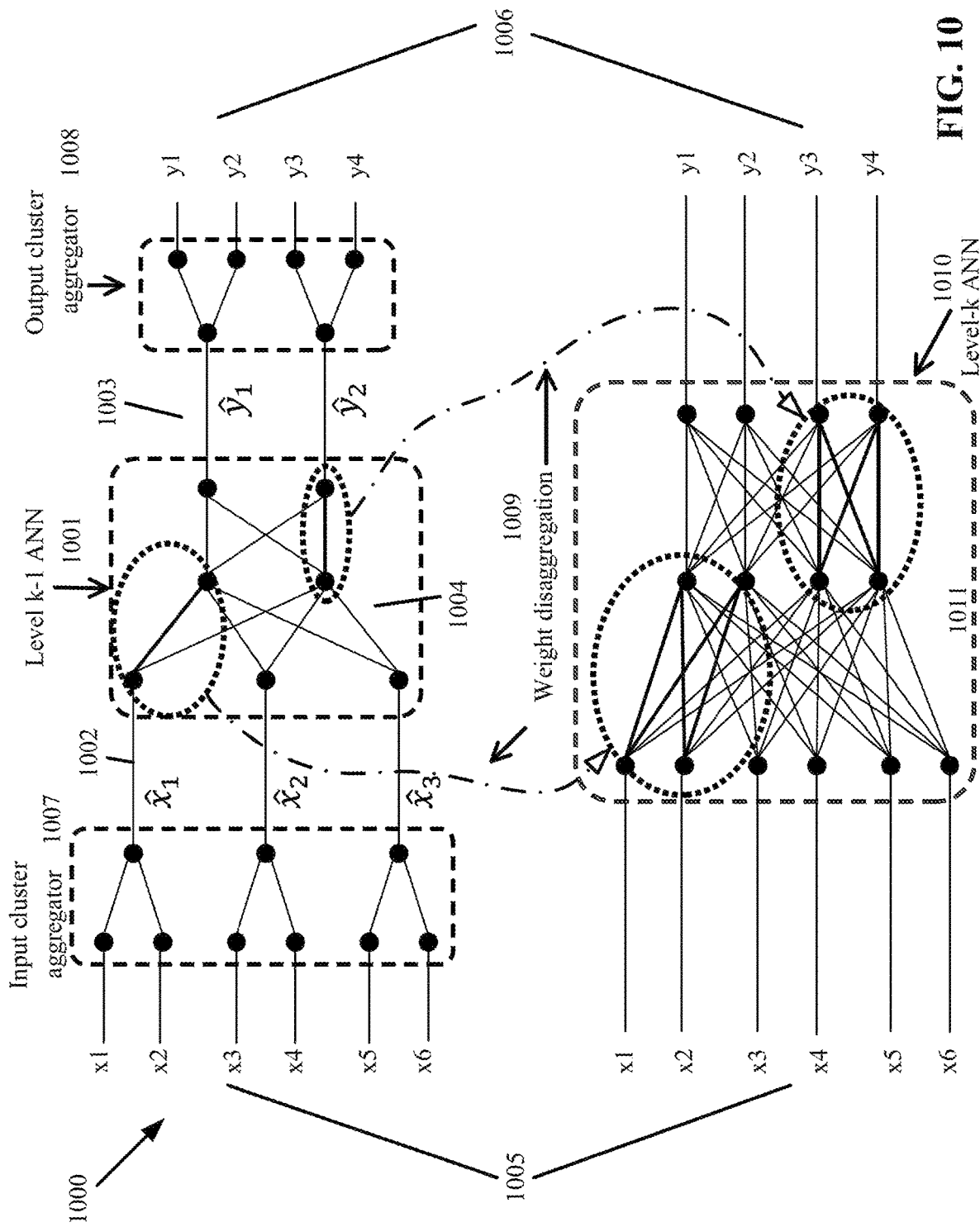
FIG. 10 shows a schematic illustration of a process for initializing a level-k (k>1) neural network based on a level-(k−1) neural network of the hierarchical neural network training method according to an embodiment of the invention.

FIG. 10 illustrates a process 1000 of building a higher level (level k with k>1) neural network model 1010 from the level-(k−1) neural network model 1001 according to one embodiment. In this illustration, the level-(k−1) neural network 1001 has three inputs 1002, namely, $\hat{x}_1, \hat{x}_2, \hat{x}_3$, and two outputs 1003, namely, $\hat{y}_1, \hat{y}_2$. The neural network 1001 has one hidden layer with two hidden nodes. The nodes of the neural network are connected through weights 1004. The nodes of the input layer are connected to the nodes of the hidden layer; the nodes of the hidden layer are connected to the nodes of the output layer. The level-k neural network has six inputs 1005, namely, $x_1, x_2, \ldots, x_6$, and four outputs 1006, namely, $y_1, y_2, y_3, y_4$.

Each input (output) at a lower-level is an aggregation of multiple inputs (outputs) at a higher-level. For instance, the level-(k−1) input $\hat{x}_1$ contains two level-k inputs $x_1$ and $x_2$; in other words, the first cluster at level (k−1) is composed of the two clusters at level k. The input cluster aggregator 1007 combines the values of $x_1$ and $x_2$ to obtain the value of $\hat{x}_1$. The combination can be realized in different manners. In one embodiment of the invention, the combination is realized as the average, that is, the output value of the aggregator is the averaged value of the input values; in other words, $\hat{x}_1=(x_1+x_2)/2$, $\hat{x}_2=(x_3+x_4)/2$ and $\hat{x}_3=(x_5+x_6)/2$. Similarly, the output cluster aggregator 1008 combines the values of $y_1$ and $y_2$ to obtain the value of $\hat{y}_1$. Since the level k neural network has more input (output, hidden layer) nodes than that of the level k−1 neural network, the number of network weights increases accordingly. The process of weight disaggregation 1009 is carried out, where network weights at level k−1 are disaggregated to level k network weights. In one embodiment of the present invention, the disaggregation is realized as a process of evenly distributing a weight value at level k−1 to the associated weights at level k. The disaggregated weights form the initial weights for the level k neural network, which are close to a (local) optimal solution of the level k neural network.

Numerical Results for Wind Forecasting. As an example, the hierarchical training process 900 of FIG. 9 is applied for wind speed forecasting. The dataset comprises historical wind speed data (10-minute interval) in year 2006 of all 74 wind turbines of a wind farm. The data in the range of February 2006 through August 2006 is used as the training dataset, while the data in the range of September 2006 through November 2006 is used as the testing dataset. In the meantime, other historical meteorological data in year 2006 (hourly ground wind speed, wind direction, temperature, dew point temperature) from two nearby weather stations (e.g., National Oceanic and Atmospheric Administration (NOAA) stations) are also collected. Preprocessing is carried out to handle missing values in the NOAA dataset. A two-layer artificial neural network is chosen as the predictive model. By construction, the input dataset has 2260 variable, comprising previous five-hour wind speed data (measured at a 10-minute interval) for each wind turbine and previous five-hour meteorological data (ground wind speed and direction, temperature, dew point) from two nearby NOAA stations; the output dataset has 444 variables, comprising next one-hour wind speed prediction at a 10-minute interval for all 74 wind turbines.

The number of levels for the hierarchical model building is K=5 for this example, and the structures of the artificial neural network model at different levels are summarized in Table 1. In this example, the conjugate gradient training algorithm is used at each level as the local solver for training the artificial neural network. For comparison, an artificial neural network model with the level-5 structure is also trained directly using the original dataset without clustering and using the conjugate gradient training algorithm. It is understood that a different algorithm may be used.

TABLE 1

| Hierarchical artificial neural network models | | | | | |
|---|---|---|---|---|---|
| | Level | Level | Level | Level | Level |
| Input Nodes | 10 | 50 | 250 | 750 | 2260 |
| Hidden Nodes | 10 | 30 | 120 | 360 | 1000 |
| Output Nodes | 8 | 32 | 96 | 192 | 444 |
| Training Iterations | 5000 | 2500 | 2500 | 1500 | 1000 |

A comparison is made between the hierarchical training process 900 and the conventional training process of a neural network model. With the process 900, the model training objective, namely the training MSE, improves very quickly during level-1 and level-2 model building, while the training MSE tends to decrease slower during higher levels. In contrast, with the conventional whole network training process, the training MSE decreases slowly throughout the whole training process. Considering the numerical values of the model performance, the predictive model produced by the process 900 has a normalized absolute percentage error (NAPE) of 7.76% on the training dataset and an NAPE of 10.52% on the testing dataset. In contrast, the neural network model produced by the conventional training process has an NAPE of 3.81% on the training dataset and an NAPE of 11.64% on the testing dataset. Therefore, the hierarchical training process 900 has a better generalization capability than the conventional training process, considering more balanced NAPEs on the training and testing datasets resulted by the hierarchical training process 900. In the meantime, the hierarchical training process 900 takes about 4.9 hours of CPU time, while the conventional training process takes about 12.8 hours of CPU time. Therefore, the hierarchical training process 900 is also computationally efficient.

Figure 11:
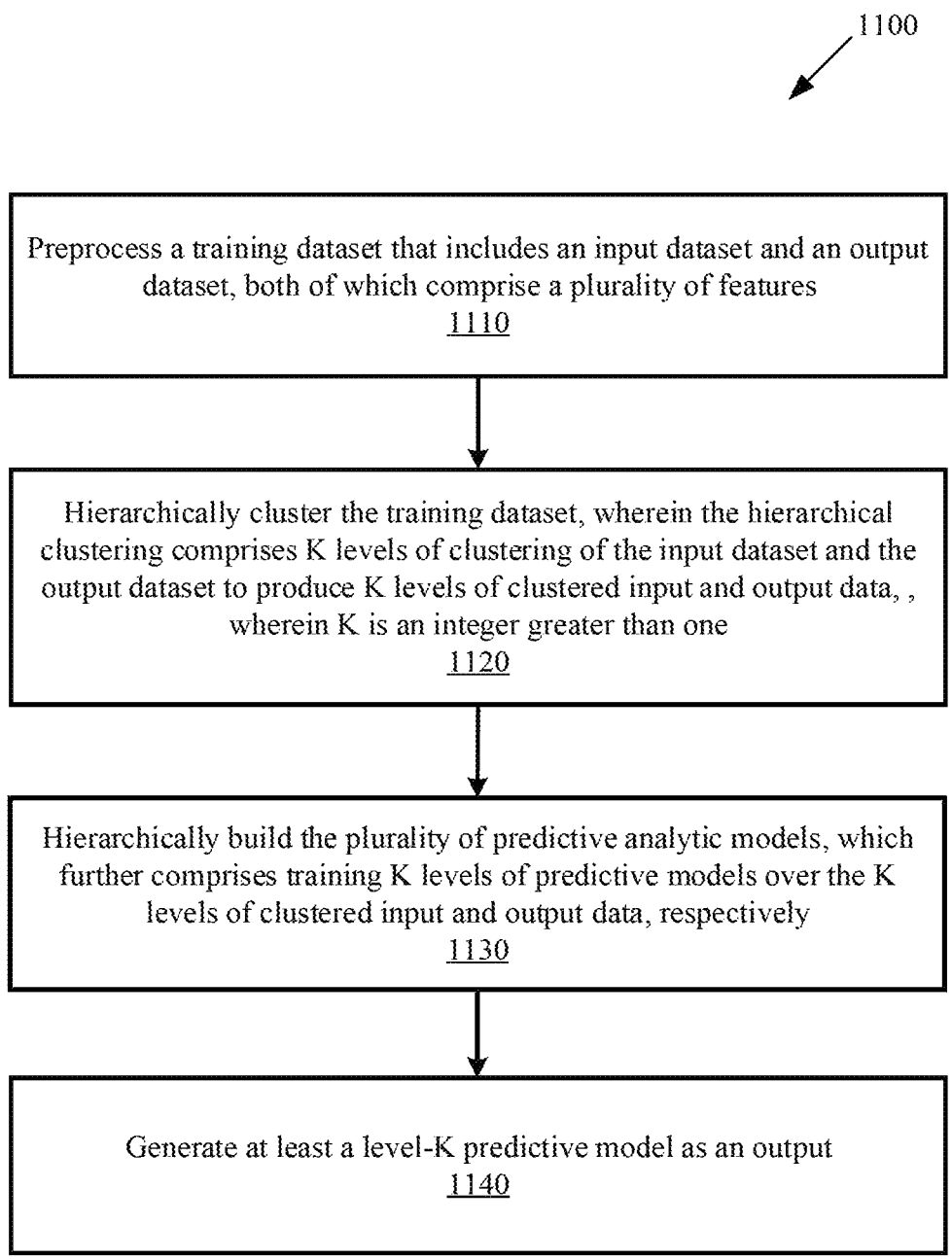
FIG. 11 illustrates a flowchart of a method which hierarchically builds predictive analytic models according to an embodiment of the invention.

FIG. 11 illustrates a flowchart of a method 1100 which hierarchically builds a plurality of predictive analytic models based on a training dataset according to one embodiment. The method 800 comprises: preprocessing the training dataset that includes an input dataset and an output dataset, both of which comprise a plurality of features (step 1110); hierarchically clustering the training dataset, wherein the hierarchical clustering comprises K levels of clustering of the input dataset and the output dataset to produce K levels of clustered input and output data, wherein K is an integer greater than one (step 1120); hierarchically building the plurality of predictive analytic models, which further comprises training K levels of predictive models over the K levels of clustered input and output data, respectively (step 1130); and generating at least a level-K predictive model as an output (step 1140).

While the method 1100 of FIG. 11 shows a particular order of operations performed by certain embodiments of the invention, it should be understood that such order is exemplary (e.g., alternative embodiments may perform the operations in a different order, combine certain operations, overlap certain operations, etc.). For example, the training of level-k predictive models (k=1, . . . , K) may start as soon as the level-k clustered input and output data are generated. One or more parts of an embodiment of the invention may be implemented using different combinations of software, firmware, and/or hardware. In one embodiment, the methods described herein may be performed by a processing system. One example of a processing system is a computer system 1200 of FIG. 12.

Figure 12:
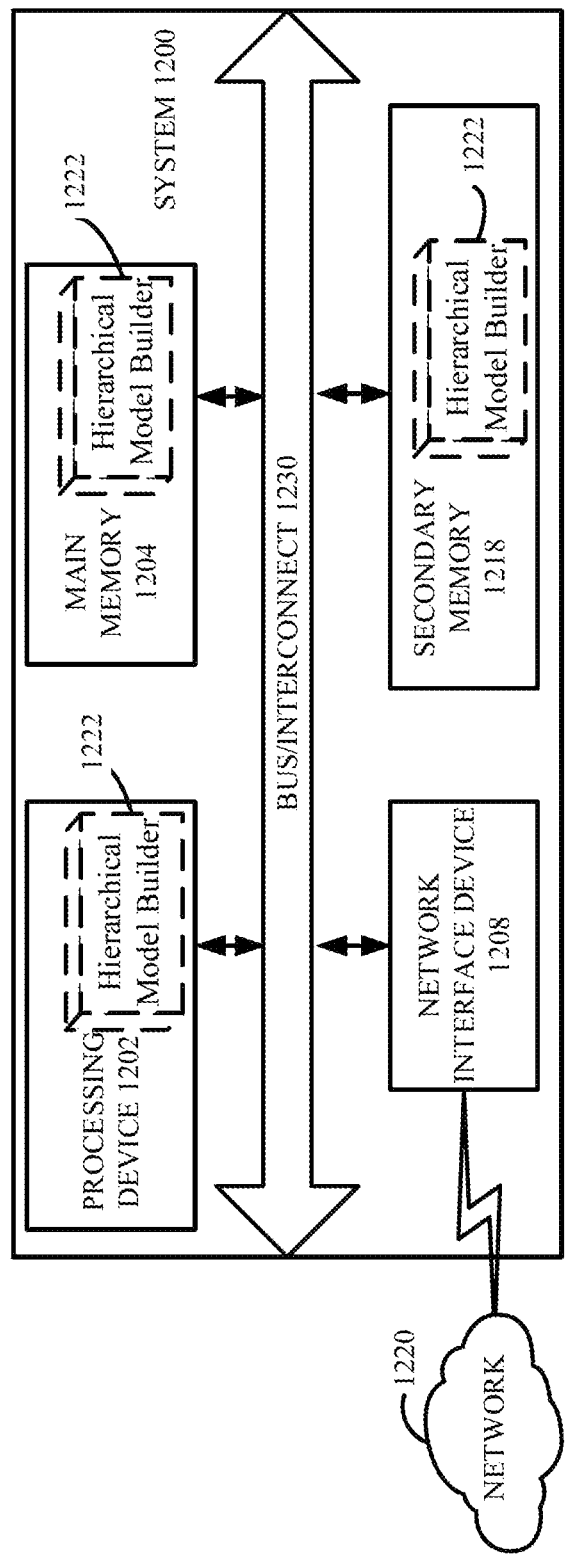
FIG. 12 is a block diagram illustrating an example of a system which hierarchically builds predictive analytic models according to an embodiment of the invention.

Referring to FIG. 12, the computer system 1200 may be a server computer, or any machine capable of executing a set of instructions (sequential or otherwise) that specify actions to be taken by that machine. While only a single machine is illustrated, the term "machine" shall also be taken to include any collection of machines (e.g., computers) that individually or jointly execute a set (or multiple sets) of instructions to perform any one or more of the methodologies discussed herein.

The computer system 1200 includes a processing device 1202. The processing device 1202 represents one or more general-purpose processors, or one or more special-purpose processors, or any combination of general-purpose and special-purpose processors. In one embodiment, the processing device 1202 is adapted to execute the operations of a smart power flow solver, which performs the methods described in connection with FIGS. 4-8 for solving power flow problems.

In one embodiment, the processor device 1202 is coupled, via one or more buses or interconnects 1230, to one or more memory devices such as: a main memory 1204 (e.g., read-only memory (ROM), flash memory, dynamic random access memory (DRAM), a secondary memory 1218 (e.g., a magnetic data storage device, an optical magnetic data storage device, etc.), and other forms of computer-readable media, which communicate with each other via a bus or interconnect. The memory devices may also different forms of read-only memories (ROMs), different forms of random access memories (RAMs), static random access memory (SRAM), or any type of media suitable for storing electronic instructions. In one embodiment, the memory devices may store the code and data of a hierarchical model builder 1222, which may be stored in one or more of the locations shown as dotted boxes and labeled as hierarchical model builder 1222.

The computer system 1200 may further include a network interface device 1208. A part or all of the data and code of the hierarchical model builder 1222 may be received over a network 1220 via the network interface device 1208. Although not shown in FIG. 12, the computer system 1200 also may include user input/output devices (e.g., a keyboard, a touch screen, speakers, and/or a display).

In one embodiment, the computer system 1200 may store and transmit (internally and/or with other electronic devices over a network) code (composed of software instructions) and data using computer-readable media, such as non-transitory tangible computer-readable media (e.g., computer tangible storage media such as magnetic disks; optical disks; read only memory; flash memory devices) and transitory computer-readable transmission media (e.g., electrical, optical, acoustical or other form of propagated signals—such as carrier waves, infrared signals).

In one embodiment, a non-transitory computer-readable medium stores thereon instructions that, when executed on one or more processors of the computer system 1200, cause the computer system 1200 to perform the method 800 of FIG. 8.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A computer-implemented method, comprising:
preprocessing a training dataset that includes an input dataset and an output dataset, both of which comprise a plurality of features;
hierarchically clustering the training dataset to produce a cluster hierarchy including K levels of clustered input data and clustered output data, level-K being a highest level, level-1 being a lowest level, and K being a positive integer, wherein the training dataset is clustered into a highest number of smallest clusters at level-K of the cluster hierarchy, and successively lower numbers of successively larger clusters at successively lower-levels of the cluster hierarchy;
generating each input datum in the clustered input data at level-(i−1) of the cluster hierarchy by aggregating multiple input data in the clustered input data at level-i of the cluster hierarchy, i being an integer between 1 and K inclusive;
generating each output datum in the clustered output data at level-(i−1) by aggregating multiple output data in the clustered output data at level-i of the cluster hierarchy;
hierarchically training a model hierarchy of predictive models using the each input datum and the each output datum at corresponding levels of the cluster hierarchy, wherein the hierarchically training further comprises:
initializing a level-i predictive model with trained optimal model parameters of a level-(i−1) predictive model, wherein trained weights of nodes in the level-(i−1) predictive model are disaggregated to form weights of nodes in the level-i predictive model; and
training the level-i predictive model with the clustered input data and the clustered output data at a corresponding level-i of the cluster hierarchy;
generating at least a level-K predictive model at a highest-level of the model hierarchy; and
using the level-K predictive model to receive new data input and to generate a prediction as output.

2. The method of claim 1, wherein the training dataset is a high-volume dataset that includes a number of data records greater than a volume threshold.

3. The method of claim 2, further comprising:
hierarchically clustering data records in the training dataset to produce hierarchically clustered data records; and
hierarchically training the model hierarchy of predictive models using the hierarchically clustered data records.

4. The method of claim 1, wherein the training dataset is a high-dimensional dataset that includes a number of features greater than a feature threshold.

5. The method of claim 4, wherein each level of the cluster hierarchy uses k-means feature clustering, and each predictive model in the model hierarchy is an artificial neural network.

6. The method of claim 4, further comprising:
hierarchically clustering data features in the training dataset to produce hierarchically clustered data features; and
hierarchically training the model hierarchy of predictive models using the hierarchically clustered data features.

7. The method of claim 1, further comprising:
computing a set of local optimal predictive models at a lower level of the model hierarchy; and
propagating the set of local optimal predictive models to higher levels of the model hierarchy.

8. The method of claim 7, wherein computing the set of local optimal predictive models further comprises:
computing a set of local optimal solutions using a TRUST-TECH method, which computes a set of stable equilibrium points (SEPs) of a dynamical system, wherein each SEP is a set of local optimal model parameters that corresponds to a local optimal predictive model.

9. The method of claim 1, further comprising:
building a predictive model at a given level of the model hierarchy using the clustered input data and the clustered output data from levels of the cluster hierarchy not exceeding the given level and a built predictive model at one level lower than the given level.

10. A system comprising:
one or more processors; and
a memory, the memory containing instructions executable by the one or more processors, the one or more processors operable to:
preprocess a training dataset that includes an input dataset and an output dataset, both of which comprise a plurality of features;
hierarchically cluster the training dataset to produce a cluster hierarchy including K levels of clustered input data and clustered output data, level-K being a highest level, level-1 being a lowest level, and K being a positive integer, wherein the training dataset is clustered into a highest number of smallest clusters at level-K of the cluster hierarchy, and successively lower numbers of successively larger clusters at successively lower-levels of the cluster hierarchy;
generate each input datum in the clustered input data at level-(i−1) of the cluster hierarchy by aggregating multiple input data in the clustered input data at level-i of the cluster hierarchy, i being an integer between 1 and K inclusive;
generate each output datum in the clustered output data at level-(i−1) by aggregating multiple output data in the clustered output data at level-i of the cluster hierarchy;
hierarchically train a model hierarchy of predictive models using the each input datum and the each output datum at corresponding levels of the cluster hierarchy;
generate at least a level-K predictive model at a highest-level of the model hierarchy; and
use the level-K predictive model to receive new data input and to generate a prediction as output,
wherein to hierarchically train the model hierarchy, the one or more processors are further operable to:
initialize a level-i predictive model with trained optimal model parameters of a level-(i−1) predictive model, wherein trained weights of nodes in the level-(i−1) predictive model are disaggregated to form weights of nodes in the level-i predictive model; and
train the level-i predictive model with the clustered input data and the clustered output data at a corresponding level-i of the cluster hierarchy.

11. The system of claim 10, wherein the training dataset is a high-volume dataset that includes a number of data records greater than a volume threshold.

12. The system of claim 11, wherein the one or more processors is further operable to:
hierarchically cluster data records in the training dataset to produce hierarchically clustered data records; and
hierarchically train the model hierarchy of predictive models using the hierarchically clustered data records.

13. The system of claim 10, wherein the training dataset is a high-dimensional dataset that includes a number of features greater than a feature threshold.

14. The system of claim 13, wherein of the hierarchical clustering uses a k-means feature clustering, and each of the K levels of predictive models is an artificial neural network.

15. The system of claim 13, wherein the one or more processors is further operable to:
hierarchically cluster data features in the training dataset to produce hierarchically clustered data features; and
hierarchically train the model hierarchy of predictive models using the hierarchically clustered data features.

16. The system of claim 10, wherein the one or more processors is further operable to:
compute a set of local optimal predictive models at a lower level of the model hierarchy; and
propagate the set of local optimal predictive models to higher levels of the model hierarchy.

17. The system of claim 16, wherein the one or more processors is further operable to:
compute a set of local optimal solutions using a TRUST-TECH method, which computes a set of stable equilibrium points (SEPs) of a dynamical system, wherein each SEP is a set of local optimal model parameters that corresponds to a local optimal predictive model.

18. The system of claim 10, wherein the one or more processors is further operable to:
build a predictive model at a given level of the model hierarchy using the clustered input data and the clustered output data from levels not exceeding the given level and a built predictive model at one level lower than the given level.

19. A non-transitory computer readable storage medium including instructions that, when executed by a computing system, cause the computing system to perform a method comprising:
preprocessing a training dataset that includes an input dataset and an output dataset, both of which comprise a plurality of features;
hierarchically clustering the training dataset to produce a cluster hierarchy including K levels of clustered input data and clustered output data, level-K being a highest level, level-1 being a lowest level, and K being a positive integer, wherein the training dataset is clustered into a highest number of smallest clusters at level-K of the cluster hierarchy, and successively lower numbers of successively larger clusters at successively lower-levels of the cluster hierarchy;
generating each input datum in the clustered input data at level-(i−1) of the cluster hierarchy by aggregating multiple input data in the clustered input data at level-i of the cluster hierarchy, i being an integer between 1 and K inclusive;

generating each output datum in the clustered output data at level-(i−1) by aggregating multiple output data in the clustered output data at level-i of the cluster hierarchy;

hierarchically training a model hierarchy of predictive models using the each input datum and the each output datum at corresponding levels of the cluster hierarchy, wherein the hierarchically training further comprises:
  initializing a level-i predictive model with trained optimal model parameters of a level-(i−1) predictive model, wherein trained weights of nodes in the level-(i−1) predictive model are disaggregated to form weights of nodes in the level-i predictive model; and
  training the level-i predictive model with the clustered input data and the clustered output data at a corresponding level-i of the cluster hierarchy;

generating at least a level-K predictive model at a highest-level of the model hierarchy; and using the level-K predictive model to receive new data input and to generate a prediction as output.

20. The non-transitory computer readable storage medium of claim 19, wherein the training dataset is a high-volume dataset that includes a number of data records greater than a volume threshold, or a high-dimensional dataset that includes a number of features greater than a feature threshold.

\* \* \* \* \*